US012615279B2

(12) United States Patent
Ezrielev et al.

(10) Patent No.: US 12,615,279 B2
(45) Date of Patent: Apr. 28, 2026

(54) VOTING AS LAST RESORT ACCESS TO PREVENT ERRONEOUS OR MALICIOUS CHANGES

(71) Applicant: Dell Products L.P., Round Rock, TX (US)

(72) Inventors: Ofir Ezrielev, Be'er Sheba (IL); Lee Serfaty, Be'er Sheba (IL); Yehiel Zohar, Sderot (IL)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/186,243

(22) Filed: Mar. 20, 2023

(65) Prior Publication Data

US 2024/0171602 A1 May 23, 2024

Related U.S. Application Data

(63) Continuation-in-part of application No. 18/057,287, filed on Nov. 21, 2022.

(51) Int. Cl.
*H04L 9/40* (2022.01)
*G07C 13/00* (2006.01)

(52) U.S. Cl.
CPC .......... *H04L 63/1433* (2013.01); *G07C 13/00* (2013.01); *H04L 63/0823* (2013.01); *H04L 63/102* (2013.01); *H04L 63/104* (2013.01); *H04L 63/105* (2013.01); *H04L 63/1416* (2013.01); *H04L 63/20* (2013.01)

(58) Field of Classification Search
CPC ............. H04L 63/1433; H04L 63/0823; H04L 63/102; H04L 63/104; H04L 63/1416; H04L 63/105; H04L 63/20; G07C 13/00
See application file for complete search history.

(56) References Cited

U.S. PATENT DOCUMENTS

| | | | |
|---|---|---|---|
| 6,748,084 B1 | 6/2004 | Gau et al. | |
| 8,181,016 B1 | 5/2012 | Borgia et al. | |
| 9,652,617 B1 * | 5/2017 | Evans | ..................... G06F 21/57 |
| 10,412,097 B1 | 9/2019 | Banshats et al. | |
| 10,601,816 B1 * | 3/2020 | Stickle | ................... H04W 4/08 |
| 10,903,991 B1 | 1/2021 | Craige et al. | |

(Continued)

FOREIGN PATENT DOCUMENTS

WO      WO-2016205886 A1 * 12/2016      ......... H04L 63/0884

OTHER PUBLICATIONS

Gunther Schiefer et al., "Security in a Distributed Key Management Approach," 2017, pp. 816-821. (Year: 2017).

(Continued)

*Primary Examiner* — Linglan Edwards
*Assistant Examiner* — Jacob Benedict Knackstedt
(74) *Attorney, Agent, or Firm* — Workman Nydegger

(57) ABSTRACT

Preventing, mitigating, and reversing actions in a computing system. A voting mechanism is provided that is configured to block malicious or accidental configuration changes or other actions in a computing system. Risky actions cannot be performed as the voting mechanism requires certain actions to be subject to a vote. The actions are then, based on the voting by other administrators, allowed, disallowed, prevented, or reversed. Further different classes of administrators can participate in the voting operations.

18 Claims, 5 Drawing Sheets

(56) References Cited

U.S. PATENT DOCUMENTS

| 11,057,210 | B1 | 7/2021 | Sierra et al. |
|---|---|---|---|
| 11,722,491 | B1* | 8/2023 | Al-Rashid ............ H04L 63/1433 |
| 11,914,696 | B1* | 2/2024 | Saxe ...................... G06F 9/4843 |
| 12,154,047 | B1* | 11/2024 | Govindan ........... G06Q 30/0633 |
| 12,299,173 | B2 | 5/2025 | O'Neil et al. |
| 2002/0184493 | A1 | 12/2002 | Rees |
| 2003/0159032 | A1 | 8/2003 | Gerck |
| 2007/0223702 | A1* | 9/2007 | Tengler ................. H04L 9/3263 |
| | | | 380/270 |
| 2009/0283597 | A1 | 11/2009 | Charles et al. |
| 2011/0022883 | A1 | 1/2011 | Hansen |
| 2012/0016723 | A1 | 1/2012 | Valles et al. |
| 2014/0195546 | A1 | 7/2014 | Ren |
| 2016/0140335 | A1 | 5/2016 | Proulx et al. |
| 2016/0277411 | A1 | 9/2016 | Dani et al. |
| 2016/0350874 | A1* | 12/2016 | Santos ................... G06Q 10/10 |
| 2018/0032750 | A1 | 2/2018 | Hammel |
| 2018/0241747 | A1 | 8/2018 | Tanaka et al. |
| 2019/0305938 | A1 | 10/2019 | Sandberg-Maitland et al. |
| 2020/0036707 | A1 | 1/2020 | Callahan et al. |
| 2020/0242232 | A1 | 7/2020 | Machani |
| 2020/0351083 | A1 | 11/2020 | Bartolucci et al. |
| 2020/0382327 | A1 | 12/2020 | Mokhasi et al. |
| 2020/0412542 | A1 | 12/2020 | Bartolucci et al. |
| 2021/0006418 | A1 | 1/2021 | Wei |
| 2021/0064759 | A1 | 3/2021 | Lomonaco et al. |
| 2021/0081520 | A1 | 3/2021 | Howarth et al. |
| 2021/0133359 | A1 | 5/2021 | Liu |
| 2021/0182423 | A1* | 6/2021 | Padmanabhan ....... H04L 9/3271 |
| 2021/0258298 | A1 | 8/2021 | Pattar et al. |
| 2021/0289033 | A1* | 9/2021 | Ahuja ................... H04L 9/0637 |
| 2022/0076253 | A1 | 3/2022 | Chaum |
| 2022/0076518 | A1 | 3/2022 | Byun |
| 2022/0182239 | A1 | 6/2022 | Hassanzadeh et al. |
| 2022/0271933 | A1 | 8/2022 | Chen et al. |
| 2022/0342980 | A1 | 10/2022 | Myers |
| 2023/0401307 | A1 | 12/2023 | Pop et al. |
| 2024/0086550 | A1 | 3/2024 | Tamir et al. |
| 2024/0154988 | A1* | 5/2024 | Yates ...................... H04L 41/16 |
| 2024/0163305 | A1 | 5/2024 | Fridman |
| 2024/0380585 | A1 | 11/2024 | Arora et al. |

OTHER PUBLICATIONS

Mohammad Faraji et al., "Identity Access Management for Multi-tier Cloud Infrastructures," 2014, pp. 1-9 (Year: 2014).

* cited by examiner

500

Storage Media
508

UI Device
510

Data Storage
512

Memory
502

NVRAM
504

Processor
506

Application(s)
514

VOTING AS LAST RESORT ACCESS TO PREVENT ERRONEOUS OR MALICIOUS CHANGES

RELATED APPLICATIONS

This application is a continuation-in-part of U.S. Ser. No. 18/057,287 filed Nov. 21, 2022, and titled VOTING AS LAST RESORT ACCESS RECOVERY FOR COMMON IDENTITY AND ACCESS MANAGEMENT, which application in incorporated by reference in its entirety.

FIELD OF THE INVENTION

Embodiments of the present invention generally relate to identity and access control and management. More particularly, at least some embodiments of the invention relate to systems, hardware, software, computer-readable media, and methods for managing and controlling actions performed or proposed in identity and access management systems.

BACKGROUND

Computing environments and systems may include a mixture of on-premise systems, cloud and/or edge-based systems. As these systems operate, data in these systems may originate at various locations and may be transmitted from one location to another location. For example, an entity may move data from on-premise locations to cloud or edge locations and vice versa.

It is beneficial and important to protect the data in these systems and to protect or control access to the data. For instance, to protect and/or control access to data and applications in a computing system, an entity may employ various strategies such as a zero-trust strategy. In a zero-trust strategy, no user, device, or network traffic is trusted by default. This type of strategy helps eliminate or at least reduce various security vulnerabilities.

One aspect of these data protection strategies relates to user authentication and access control. A common way to protect data or control access is to use basic username/password authentication. This type of authentication, however, may not provide sufficient long-term security. Certificate based authentication and access control is viewed as more secure.

Even when security is certificate based, it is possible for actions to be performed in a malicious manner. It is also possible that actions may be performed accidentally or erroneously.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
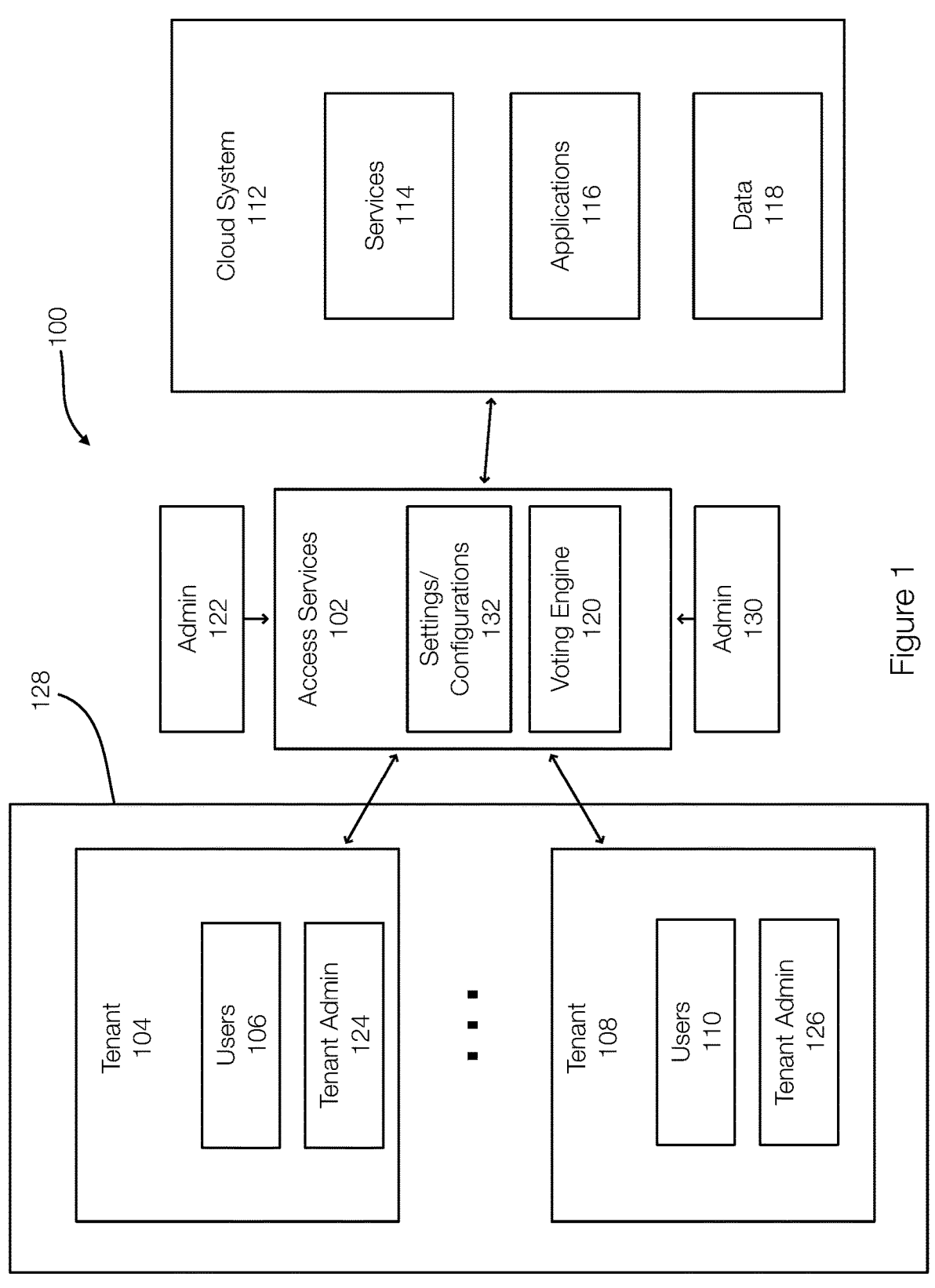
FIG. 1 discloses aspects of an environment that allows an access services administrator to be reinstated when their certificate is not valid or has expired.

Embodiments of the present invention generally relate to services, which may include identity and access management. More particularly, at least some embodiments of the invention relate to systems, hardware, software, computer-readable media, and methods for managing and/or controlling actions or changes in the context of providing access services.

Embodiments of the invention more specifically relate to managing actions and/or that may be performed or proposed in applications, in services, or in a computing system. The actions (or changes) being performed/managed may include malicious actions, erroneous actions, accidental actions, risky actions, or the like or combination thereof. Many of these actions relate to system configurations, access controls, authentication, or other services or functionality provided by computing system such as access services.

Managing actions may include performing voting operations with respect to actions, admins, or the like in order to improve security. The voting operations may be to allow an action, prevent an action, reverse an action, revoke certificates, admit an admin, remove an admin, or the like or combinations thereof. Embodiments of the invention are discussed in the context of access/authentication services but may be applied to other systems or services.

Embodiments of the invention further relate to a voting mechanism that allows administrators within the same class or within a less privileged class to vote on actions that have been performed or that are proposed by an administrator. The voting mechanism may allow a group of administrators to manage actions performed/proposed by a specific administrator.

The voting mechanism may be implemented within a single class of administrators. In another example, the voting mechanism may allow a less privileged class of administrators to vote with respect to an action performed/proposed by a more privileged administrator.

For example, if a malicious user gains access to a system with admin privileges, the damage intended/caused by that malicious user may be prevented/mitigated by the voting mechanism. The voting mechanism or operation may operate to prevent a single admin from performing actions in general or from performing certain actions (e.g., actions deemed critical). When a voting operation is invoked in the context of a particular action, the administrator that wants to perform that action will not be able to perform that particular action unless the other administrators vote to allow the action. Thus, various types of actions, including damaging actions, can be prevented or mitigated. In addition, the fact that a vote is being required may apprise other administrators of the presence of a malicious user and allow the other administrators to take appropriate actions.

More specifically, example embodiments of the invention relate access management systems or services (referred to herein as access services). Common/Customer Identity and Access Management (CIAM) is an example of access services. Access services may control or manage client/user authentication, control data access, or the like. Access services ensure that customers can receive consistent configurations and capabilities across their application deployments in computing environments.

In a multi-tenant environment, access services may be managed by an admin or a group of admins. Each tenant is managed by at least one tenant administrator (a tenant admin). These tenant admins may also be associated with specific roles or permissions. The admins are one class of administrators and tenant admins are a less privileged class of administrators with respect to the access services. An admin of the access services, for example, may have roles or permissions that allow the admin to perform operations, actions, or determine settings that impact multiple tenants. A tenant admin is limited to roles and permissions of a specific tenant.

When performing their duties and responsibilities, an admin may perform various actions. The actions include managing tenant admins and managing access to corresponding applications/data. By way of example, admins may ingest tenant admins, manage certificates, or provide other services for tenant admins and/or users of those tenants. Admins may control/set tenant configurations and access services configurations, control certificate protocols, install/revoke certificates, manage/set access control policies, determine system and application settings and configurations, control data protection operations, perform data related operations including deletion operations, or the like. Admins may control/manage authentication policies and identifies, control/manage access policies, control user roles, control/manage keys, control/manage data buckets, or the like.

The actions performed by admins are generally performed for the benefit of the tenants. If an action is performed accidentally or erroneously, the operation of access services and the tenants may be adversely impacted. A malicious user that gains admin status or privileges can cause substantial damage to access services and to the tenants.

Embodiments of the invention relate to a voting process to prevent/mitigate/reverse actions, including malicious actions, and/or to prevent/mitigate/reverse erroneous or accidental actions. Embodiments relate to voting operations within a class of administrators and to voting operations may involve/affect multiple administrator classes.

In one example, a voting operation is performed with respect to an action that has been performed, initiated, or proposed. The status of the action may vary, but the voting operation is generally similar for each type of action status. The difference may be in the response or result of the voting operation. Voting operations for actions that have been performed may result in operations to reverse the action, revoke an admin's certificate, or the like. Voting operations for actions that are proposed may result in operations to prevent or stop the action, a request for additional reasons to perform the action, revoke an admin's certificate, or the like.

In some examples, the voting operation is an intraclass vote while in other examples, the voting operation may involve multiple classes of administrators. For example, a vote may be taken with a group of admins to determine whether an action proposed by an admin will be allowed to proceed. In another example, a less privileged class of administrators may vote to prevent, reverse, or overrule an action taken/proposed by an admin with higher privileges. In this example, a high percentage of votes may be required to overrule the action of admin with higher privileges.

The voting operation can be initiated in different manners. Some actions may require a vote before being implemented. In another example, an admin may trigger a vote when the admin determines that a particular action has occurred. A less privileged admin (or a quorum of less privileged admins) may initiate a vote for an action performed/proposed by a higher privileged admin. In some examples, an action is paused when the voting operation is initiated or triggered.

When the voting is affirmative, an output or voting result action may be performed automatically. For example, if voting to reverse an action, the action is reversed if the vote is affirmative or higher than a threshold vote. If an action is being proposed, the action is performed if the vote to proceed is affirmative. Thus, the output of a voting engine or result of a voting operation can be implemented automatically.

FIG. 1 discloses aspects of a multi-tenant system including or associated with access services. The multi-tenant system 100 may include on-premise, edge, and/or cloud computing systems and machines. FIG. 1 illustrates tenants 128, represented by tenants 104 and 108, of a cloud system 112. The cloud system 112 may include or provide, by way of example only, services 114, applications 116, and data 118 to the tenants 128.

Each of the tenants 128 may use at least some of the same services 114 and applications 116 (and may use the same instance of an application). The data 118, which may be stored in storage devices, may include the data of each of the tenants 128. However, the cloud system 112 is configured to keep data of the tenant 104 independent and separate from the data of the tenant 108. The data of a particular tenant is never available or accessible by any other tenant.

The tenant 104 may include users 106, which also represents devices that may access the cloud system 112 (e.g., client devices) and a tenant admin 124, which may also include or be associated with a tenant admin device. The tenant 108 may similarly include users 110 and a tenant admin 126.

The access services 102 is configured to control and manage identity and access of the tenants 128 to the cloud system 112. This access services 102 may include authentication, access control, customer registration, account management, consent, management, directory services, and the like or combination thereof. Actions performed by the admins may impact these aspects of the access services 102.

The access services 102 is controlled or managed by admins, represented by an admin 122 and an admin 130. The admins 122 and 130 (as well as the tenant admins 124 and 126 and the users 106 and 110) may also be registered with the access services 102 and may be associated with roles, privileges, or the like. Devices may be similarly registered. Thus, the admins 122 and 130 (as well as the tenant admins 126 and 126 and users 106 and 110) may be able to perform certain operations from certain devices. Alternatively, the admins 122 and 130 (or other tenant admin or user) may be able to perform their roles and permissions from any device as long as properly authenticated.

In this example, the users 106, 110, the tenant admins 124, 126, and the admins 122 and 130 are each associated with a certificate. The certificates of the admins 122 and 130 (and of other admins/clients/users) are typically used, including in a zero-trust strategy, whenever access is requested or when any operation or other action is performed. In one example, the certificates may be used for authentication while roles or permissions may be used to control access after authentication. The admins 122 and 130 may control authentication operations, data, roles, permissions, and the like. The admins 122 and 130 generally have sufficient privileges to take actions (e.g., make changes to) with regard to the setting and configurations 132 of the access services 102. The admins 122 and 130 may also be able to perform actions with regard to the services 114, the applications 116, and the data 118.

The access services 102 is configured with a voting engine 120 that may be invoked or used with regard to actions performed by any of the admins 122 and 130, and/or other admins/users. Thus, the voting engine 120 is configured to perform a voting operation with respect to an action or with respect to multiple actions when invoked. The voting engine 120 may also be invoked by the tenant admins 124 and 126. The tenant admins, such as the tenant admin 124, may invoke the voting engine 120 using, for example, a REST API.

The voting engine 120 may be invoked to perform a voting operation such that a vote can be taken to prevent an action, challenge a proposed action, reverse a performed action, evict an admin, restrict admin privileges, revoke certificates, install certificates, or the like or combinations thereof.

Figure 2:
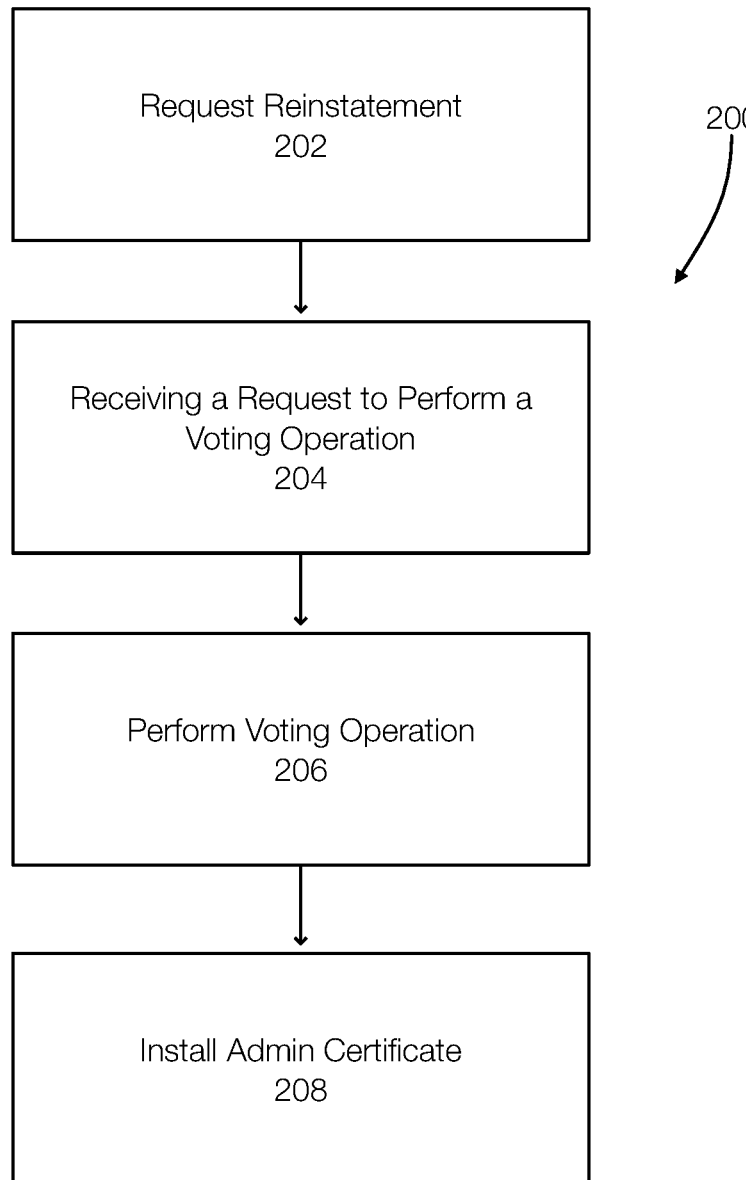
FIG. 2 discloses aspects of reinstating an access services administrator.

FIG. 2 discloses aspects of voting to perform a proposed action such as reinstating an admin that is locked-out due to an invalid or expired certificate. In this example an admin that has been locked out is requesting an action. In this case, the action subject to vote is to reinstate an admin that is locked out (e.g., due to an expired certificate). The method 200 may include performing 202 or receiving a reinstatement request. More specifically, the locked-out admin may discover that their certificate has expired and that they cannot access the access services or perform operations/ actions on behalf of or for the benefit of the tenants.

In this example, the admin may contact the tenant admins and send a request for reinstatement, which is received by the tenant admins or their devices. This may be achieved in any manner available to the admin. For example, the admin may send an email to the tenant admins request reinstatement as the admin. The request for reinstatement may be sent by text, by email, by telephone, or the like. This also allows the tenant admins to verify the admin or to verify the identity of the admin requesting reinstatement. Receiving a text or email from the admin may be sufficient for the tenant admins to confirm that the admin cannot access the access services and that the admin requesting reinstatement is the actual admin of the access services. In another example, the request from the admin may include a secret word or other key that is recognized by the tenant admins.

The request for reinstatement from the access services admin may include a new certificate of the admin, which cannot be installed or used by the admin because the admin is currently locked out of the access services. However, the admin can generate the new certificate at any time.

Assuming that a tenant admin agrees with the request for reinstatement received from the admin, the tenant admin may issue or perform a request to perform a voting operation. The request from the tenant admin may be received 204 at the access services or at a voting engine. This request may be performed using a REST API. The request to perform a voting operation may also include characteristics of the admin. For example, the tenant admin may fill out a digital form indicating how the tenant admin verified the identity of the admin requesting reinstatement.

Next, a voting operation is performed 206 by the voting engine. In the voting operation, the tenant admins may each be provided with a link (e.g., via email) from the voting engine to a web page that allows them to register their vote. The tenant admins may, alternatively, access an existing API specifically configured for voting operations. The web page may include the information detailing how the identity of the admin was verified by the tenant admin that initiated the voting operation. The tenant admins may access a specific URL (e.g., a link on the web page that includes the admin's information) to register their vote. Before reinstating the admin, the voting operation may require a threshold approval level. The threshold level may be any percentage desired by the access services or by the tenants as a whole. The voting operation may be able to complete successfully and authorize or recommend reinstatement as long as a majority of a quorum of the tenant admins vote or if a quorum responds to the voting operation and/or satisfies a threshold level. In general, any mechanism that allows tenant admins to express their vote on reinstating the admin may be used. Typically, this is performed in a technical manner. Thus, clients may access a web page or API to automatically cast their digital vote or response to the request for reinstatement.

Performing 206 the voting operation may also include collecting votes from applications. This may be performed by matching data collected from the admin with information available in or to the applications (e.g., the admin's most recent IP address, an action recently performed by the admin, a sequence of actions in order performed by the admin, or the like).

If the reinstatement of the admin is approved by the voting operation, the admin certificate is installed 208. As previously stated, the request for reinstatement may have included a new certificate. In one example, the tenant admin that initiated or sent the request to perform the voting operation (at 204) may be granted privileges that can be executed a single time and/or within a determined time period. This gives, in one example, the tenant admin privileges associated with the admin such that the new admin certificate can be installed or added to the access services.

Once the new certificate of the admin is installed 208, access to the access services is restored to the admin and the temporary privileges granted to the tenant admin may be revoked or terminated.

FIG. 2 demonstrates that an action (reinstatement) proposed by an admin in a first administrator class may be subject to a vote taken in a different class of administrators—the tenant admins.

Figure 3:
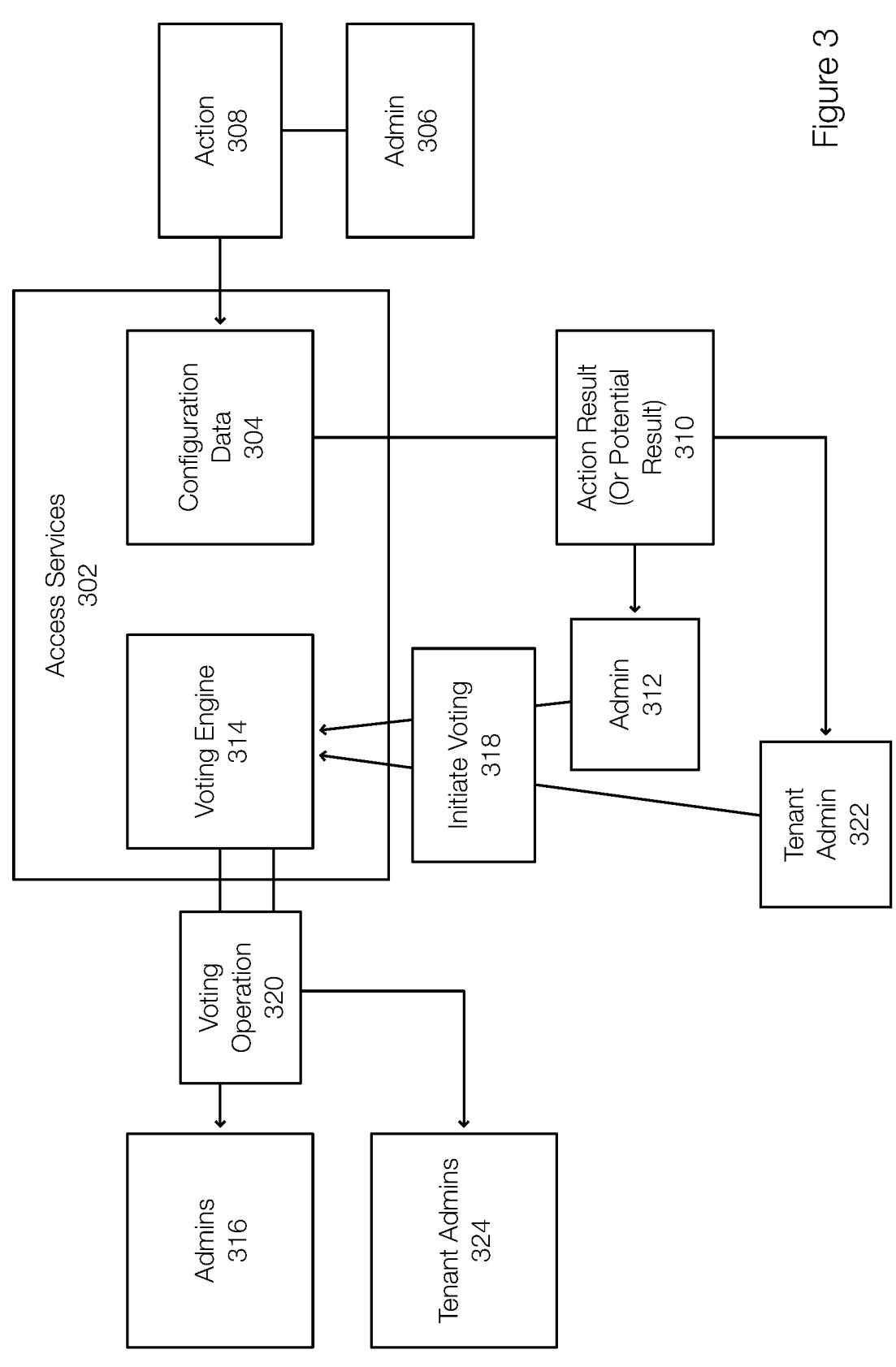
FIG. 3 discloses aspects of a voting operations performed with respect to actions in a computing system or environment.

FIG. 3 discloses aspects of voting operations with respect to admin actions. FIG. 3 illustrates access services 302, which may be managed by admins 316. The admins 316 may include an admin 306 and an admin 312. The access services 302 may include configuration data 304 and a voting engine 314.

In this example, the admin 306 performs/proposes an action 308 that is directed to or performed on the configuration data 304. The action result 310 (or the potential result if the action 308 is a proposed action) may be noticed or detected by the admin 312. In one example, the voting engine 314 may monitor the configuration data 304 and be configured to notify the admins 316 of actions performed on the configuration data 304. When a zero trust architecture is employed, any action may be subject to authentication and/or approval prior to execution.

In this example, the action result 310 detected or reviewed by the admin 312 is called into question. The admin 312 may consider the action 308 to be erroneous, a mistake, malicious, wrong, untimely, or the like. Thus, the admin 312 may initiate voting 318 by accessing the voting engine 314 using, for example, an API. In response, the voting engine 314 may initiate a voting operation 320 that is directed, in this example, to the admins 316.

The admins 316, in response to a communication from the voting engine 314, may use an API to access a webpage or an interface or may be provided with a link to a webpage. The webpage may include a user interface that identifies the action 308 and may present each of the admins 316 with options. The options may include allow the action (if not yet performed) or reverse the action (if already performed). The admins 316 may also be able to vote that the action is/appears malicious, erroneous, or the like. The admins 316 may also be allowed to vote on whether access granted to the admin 306 should be revoked.

The voting engine 314 may tabulate the results and act accordingly. If a threshold vote is set (e.g., a majority (>50%) a supermajority (>75%) or complete agreement (100%)), then the voting result must satisfy the relevant threshold.

In another example, the admin 306 may be a malicious user that has gained access to the access services as an admin. Actions that change the configuration data can be detected and be subject to a vote without input from any admin. In one example, the voting engine 314 may be invoked based solely on the proposed action by the malicious user. Alternatively, the admin 312 or a tenant admin 322 may initiate voting 318 once the action of the malicious user or the impact of the action is noticed.

More specifically, the voting operation may be triggered when an action is anomalous or suspicion. For example, an action that is typically performed at non-working hours may be viewed as suspicious if triggered during working hours or if triggered by a new user, or the like. The voting operation may be triggered based on the potential impact of the action. Thus, an action that revokes admin certificates may be subject to a vote. Actions can be categorized (e.g., from 1 to 5 based on criticality (5 being a highest criticality), based on impact, or the like. Thus, actions categorized as 5 are always subject to a vote. Other schemes for requiring votes may be implemented. Thus, action types, action impact, or the like may be used to automatically trigger a vote.

The admin 312 and/or the tenant admin 322 can also specify a type of vote. If the action 308 is viewed as malicious, the vote may be taken to prevent/reverse the action 308 and remove the admin 306 from the access services 302. If the action 308 is viewed as erroneous, the vote may be taken to the prevent/reverse the action 308. The admin 306 may be queried regarding the reason for the action 308. Other types may be intra class vote, interclass vote, or the like.

In one example, a malicious admin 306 may delete (or attempt to delete) other admins 316 from the access services. In this example, the tenant admin 322 (or another admin) may initiate voting 314 to remove the malicious admin 306 and/or undo damage to the extent possible. Because this example includes a vote by less privileged administrators, a higher vote threshold may be required from the tenant admins 324. If the malicious admin 306 is successfully voted out, the tenant admins 324 can also vote to enable access to a correct admin 312.

More generally, embodiments of the invention allow voting as a consensus mechanism to prevent critical configuration changes by malicious users or due to erroneous actions. Embodiments of the invention provide assurance that risky operations cannot be applied to sensitive operations/configurations/data/applications without being approved or agreed to by other admins.

In one example, actions that can be performed in access services may be associated with a criticality level (e.g., low, medium, high). When an action is performed or proposed, the criticality level is assessed. Actions that have a high level of criticality are subject to a voting operation.

In one example, a computing system, such as access services may include security systems that automatically analyze risk with regard to entities int the computing system that may be compromised. The risk may be represented as a probability. For example, when admin A performs an action B when their risk of being compromised is over a threshold level, the action B may be flagged and a voting operation may be initialized.

In another example, different actions may have different detrimental potential to the computing system if performed by an entity incorrectly or maliciously. For example, changing a load balancing scheme is usually less risky than changing the security configuration.

For the systems—different actions have different detrimental potential to the system if done wrong, by an adversary. For example, changing load balancing scheme is usually less risky that changing security configuration.

This allows the voting engine, for example, to initialize voting operations based on an analyzed risk ratio (e.g., probability of being compromised over a threshold) or based on risk of the action (e.g., load balancing versus security configuration).

Figure 4:
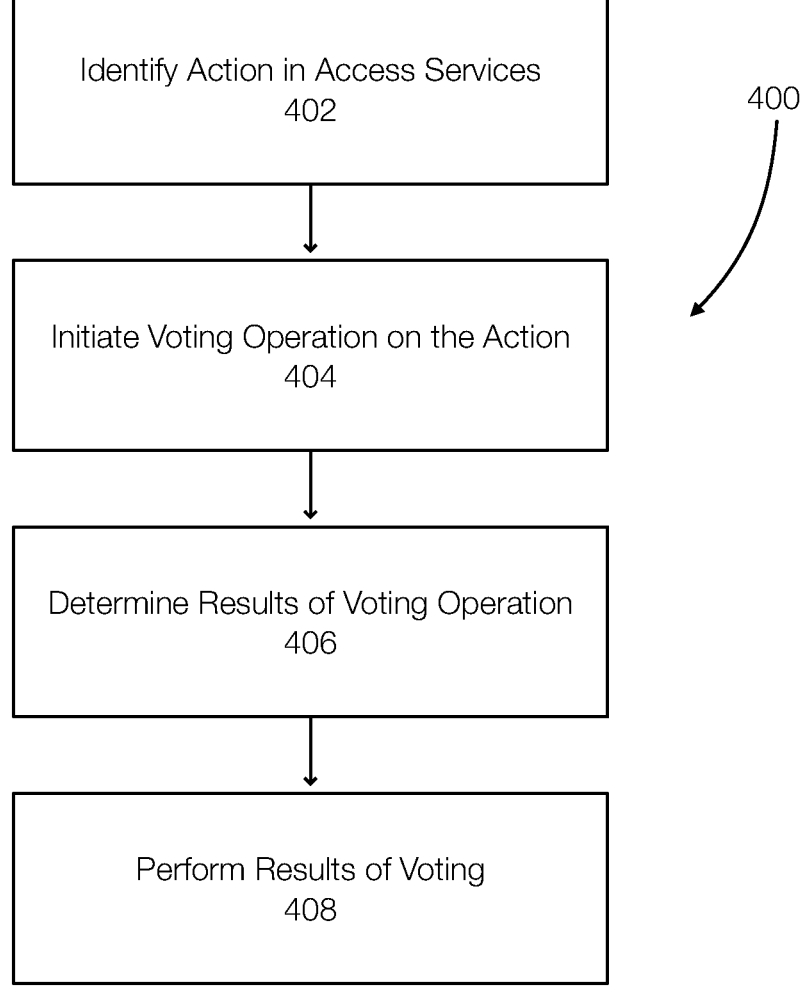
FIG. 4 discloses aspects of a voting operation related to an action in a computing system.

FIG. 4 discloses aspects of voting in the context of system actions. For example, the method 400 may be performed to prevent a malicious user from taking control of a system. The method 400 may also prevent/mitigate/reverse actions including malicious actions, erroneous actions, accidental actions, or the like.

In the method 400, an action in the computing system (e.g., access services) is identified 402. The action may be identified by another admin, automatically based on criticality level, or the like. Once identified, a voting operation is initiated 404. The voting operation can be initiated by another admin in the same class, by a tenant admin in a different administrator class, or the like. Initiating the voting operation includes performing the voting operation. This may include gathering or collecting votes from other admins of one or more administrator classes.

Next, the results of the voting operation are determined 406. The voting operation may be subject to a threshold vote requirement. For example, some actions may require an affirmative majority. Other actions may require a supermajority (e.g., 66%, 75%). Other actions may require 100% consensus. Votes from a lower administrator class that impacts actions from a higher administrative class may be subject to quorum requirements and a higher threshold vote requirement (e.g., 90%). These threshold levels are provided by way of example and can be set higher or lower.

Once the results are determined, results are performed 408. More specifically, an action corresponding to a reason for the vote may be performed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, identity and/or access control operations, reinstatement operations, voting operations, certificate related operations, action blocking operations, configuration protection operations, access recovery operations or the like or combination thereof. More generally, the scope of the invention embraces any operating environment in which the disclosed concepts may be useful.

Example cloud computing environments, which may or may not be public, include storage environments that may provide data protection or data storage functionality for one or more clients. Another example of a cloud computing environment is one in which processing, data protection, and other, services may be performed on behalf of one or more clients or tenants. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines, containers, or virtual machines (VMs), though no particular component implementation is required for any embodiment.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: identifying an action in a computing system performed by a user, initiating a voting operation related to the action, wherein initiating the voting operation includes collecting votes from administrators of the computing system, determining results of the voting operation, and performing a voting action based when the results exceed a threshold requirement.

Embodiment 2. The method of embodiment 1, wherein the action is a critical action that requires the voting operation to be initiated or wherein the voting operation is initiated automatically by a voting operation or by an admin of the computing system.

Embodiment 3. The method of embodiment 1 and/or 2, wherein the voting operation is an intraclass operation where the administrators are voting on the action belong to a first class of administrators and wherein the action is associated with a second class of administrators having higher privileges than the first class of administrators.

Embodiment 4. The method of embodiment 1, 2, and/or 3, wherein the voting action is to prevent the action from occurring in the computing system or allow the voting action to be performed.

Embodiment 5. The method of embodiment 1, 2, 3, and/or 4, wherein the voting action is to revoke a certificate associated with the user, wherein the voting operation determines that the action is a malicious action and the user is a malicious user that has obtained admin privileges.

Embodiment 6. The method of embodiment 1, 2, 3, 4, and/or 5, wherein the voting operation is an interclass voting operation, further comprising collecting votes from a first class of administrators, wherein the action is associated with a higher class of administrators, wherein the threshold requirement is higher than a threshold required when the voting operation is an intraclass voting operation.

Embodiment 7. The method of embodiment 1, 2, 3, 4, 5, and/or 6, wherein the threshold requirement is greater than 50% or greater than 66 percent, or greater than 75%.

Embodiment 8. The method of embodiment 1, 2, 3, 4, 5, 6, and/or 7, wherein the voting operation is configured to prevent operations from being performed on certain configurations of the computing system without being approved by at least a majority of administrators.

Embodiment 9. The method of embodiment 1, 2, 3, 4, 5, 6, 7, and/or 8, wherein the voting operation is configured to prevent, mitigate, or reverse malicious, accidental, and/or erroneous actions, further comprising providing the administrators access to a user interface configured to receive the votes from the administrators.

Embodiment 10. The method of embodiment 1, 2, 3, 4, 5, 6, 7, 8, and/or 9, further comprising initiating the voting operation based on a risk associated with the action or based on an analyzed risk ratio of the action or the user.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, or agent may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
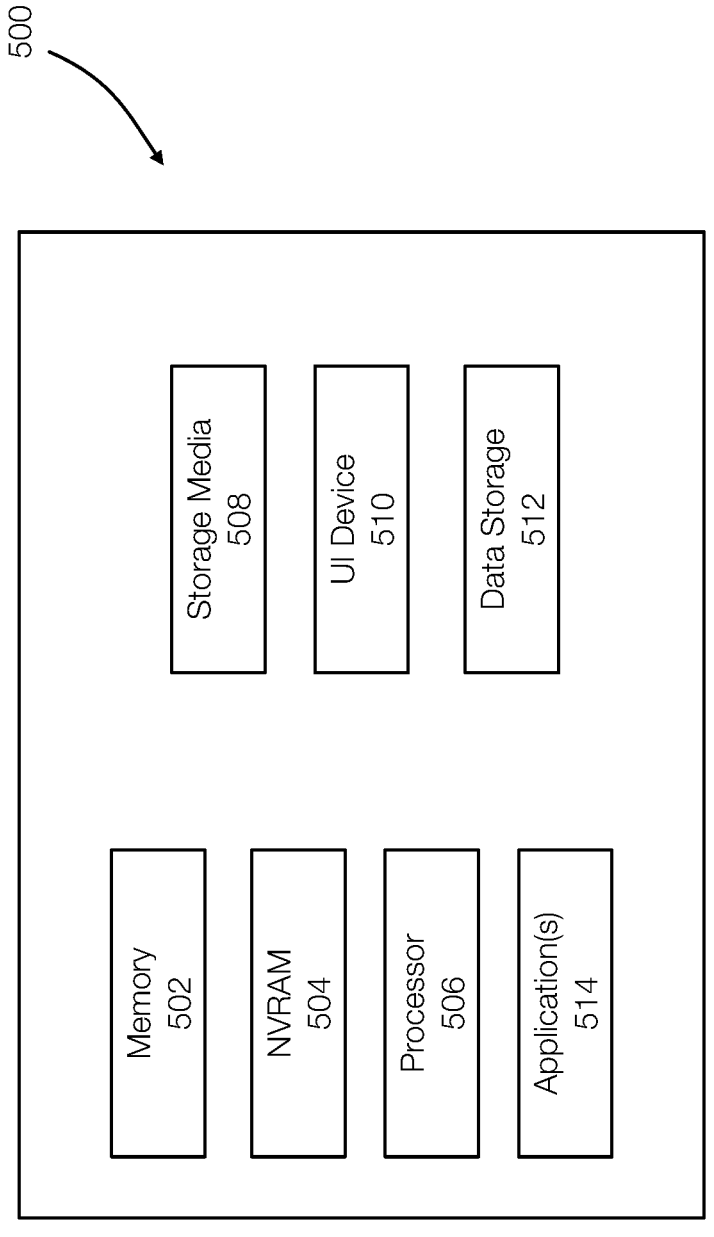
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. Embodiments thus relate to non-transitory computer readable medium. The device 500 may also represent an on-premise system, an edge system, a cloud system, a cluster, or the like or combinations thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, executed by one or more processors of a computing system that provides identity and access management services, the method comprising:

detecting a request to perform an action that modifies a configuration, certificate, or access control setting in a computing system associated with a user;

classifying, by a risk analysis module of the computing system, the action request as normal, anomalous, or high-risk based on a computed risk score using contextual data of the user and the action;

automatically suspending execution of the action request pending authorization;

initiating, by a voting engine of the computing system, an automated voting operation related to the suspended action request by selecting a first class of administrators or a second class of administrators, wherein initiating the voting operation includes collecting cryptographically authenticated votes from the selected class of administrators of the computing system via digitally signed, time-stamped transaction messages transmitted through a secure administrator interface;

determining results of the voting operation by verifying digital signatures of the received votes and computing a quorum result; and performing a voting action based on when the results exceed a threshold requirement, wherein the threshold requirement is higher when the selected class of administrators is the second class of administrators, wherein the voting action includes automatically executing, by the computing system without manual intervention, one or more corrective security actions based on the authenticated voting result, including presenting each of the administrators in the selected class with a secure user interface that identifies the suspended action request and presents options including at least one of:

preventing the action from being performed if the action has not been performed;

reversing the action if the action has already been performed;

performing the action if the action has not been performed;

allowing the action to stand as performed;

determining that the action is malicious; and revoking access of the user to the computing system by automatically revoking or re-issuing a corresponding digital certificate associated with the user.

2. The method of claim 1, wherein the action request is a critical action that requires the voting operation to be initiated or wherein the voting operation is initiated automatically by a voting operation or by an admin of the computing system.

3. The method of claim 1, wherein the voting operation is an intraclass operation where the selected administrators voting on the action belong to the second class of administrators and wherein the action is associated with the first class of administrators having higher privileges than the second class of administrators.

4. The method of claim 1, wherein, after determining that the action is malicious and that the user has obtained admin privileges, revoking a certificate associated with the user.

5. The method of claim 1, wherein the voting operation is an interclass voting operation, further comprising collecting votes from the first class of administrators and from the second class of administrators, wherein the action is associated with a higher class of administrators, wherein the threshold requirement is higher than a threshold required when the voting operation is an intraclass voting operation by the selected class of administrators.

6. The method of claim 1, wherein the threshold requirement is greater than 50% or greater than 66 percent, or greater than 75%.

7. The method of claim 1, wherein the voting operation is configured to prevent operations from being performed on certain configurations of the computing system without being approved by at least a majority of the selected administrators.

8. The method of claim 1, wherein the voting operation is configured to prevent, mitigate, or reverse malicious, accidental, and/or erroneous action requests, further comprising providing the selected administrators access to the user interface configured to receive the votes from the selected administrators.

9. The method of claim 1, further comprising initiating the voting operation based on a risk associated with the action or based on an analyzed risk ratio of the action or the user.

10. A non-transitory storage medium having stored therein instructions that are executable by one or more hardware processors to perform operations comprising:

detecting a request to perform an action that modifies a configuration, certificate, or access control setting in a computing system associated with a user;

classifying, by a risk analysis module executed by the hardware processors, the action request as normal, anomalous, or high-risk based on a computed risk score;

automatically suspending execution of the action request pending approval;

initiating, by a voting engine of the computing system, an automated voting operation related to the suspended action request by selecting a first class of administrators or a second class of administrators, wherein initiating the voting operation includes collecting cryptographically authenticated votes that are digitally signed by each administrator's certificate from the selected class of administrators;

determining, by the voting engine, results of the authenticated voting operation by verifying the digital signatures and computing a quorum result; and performing an automated corrective action based on when the results exceed a threshold requirement, wherein the threshold requirement is higher when the selected class of administrators is the second class of administrators, wherein the automated corrective action includes automatically controlling execution of the action request by enabling or blocking the modification based on the authenticated voting result and presenting each administrator with a secure interface that displays the suspended action and authenticated vote status, including options to:

preventing the action from being performed if the action has not been performed;

reversing the action if the action has already been performed;

performing the action if the action has not been performed;

allowing the action to stand as performed;

determining that the action is malicious; and revoking access of the user to the computing system.

11. The non-transitory storage medium of claim 10, wherein the action request is a critical action that requires the voting operation to be initiated or wherein the voting operation is initiated automatically by a voting operation or by an admin of the computing system.

12. The non-transitory storage medium of claim 10, wherein the voting operation is an intraclass operation where the selected administrators voting on the action belong to the second class of administrators and wherein the action is associated with the first class of administrators having higher privileges than the second class of administrators.

13. The non-transitory storage medium of claim 10, wherein, after determining that the action is malicious and that the user has obtained admin privileges, revoking a certificate associated with the user.

14. The non-transitory storage medium of claim 10, wherein the voting operation is an interclass voting operation, further comprising collecting votes from the first class of administrators and from the second class of administrators, wherein the action is associated with a higher class of administrators, wherein the threshold requirement is higher than a threshold required when the voting operation is an intraclass voting operation by the selected class of administrators.

15. The non-transitory storage medium of claim 10, wherein the threshold requirement is greater than 50% or greater than 66 percent, or greater than 75%.

16. The non-transitory storage medium of claim 10, wherein the voting operation is configured to prevent operations from being performed on certain configurations of the computing system without being approved by at least a majority of the selected administrators.

17. The non-transitory storage medium of claim 10, wherein the voting operation is configured to prevent, mitigate, or reverse malicious, accidental, and/or erroneous action requests, further comprising providing the selected administrators access to the user interface configured to receive the votes from the selected administrators.

18. The non-transitory storage medium of claim 10, further comprising initiating the voting operation based on a risk associated with the action or based on an analyzed risk ratio of the action or the user.

* * * * *